Dec. 1, 1964  C. A. KOMSTADIUS  3,158,941
KEYWAY MEASURING INSTRUMENT
Filed June 1, 1961
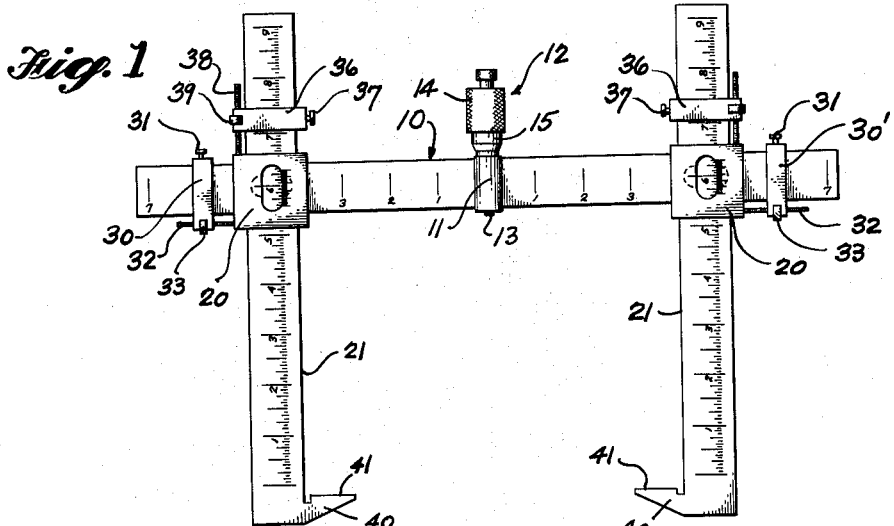
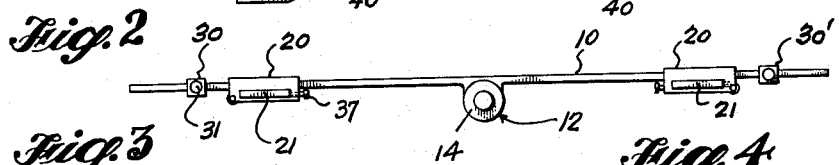
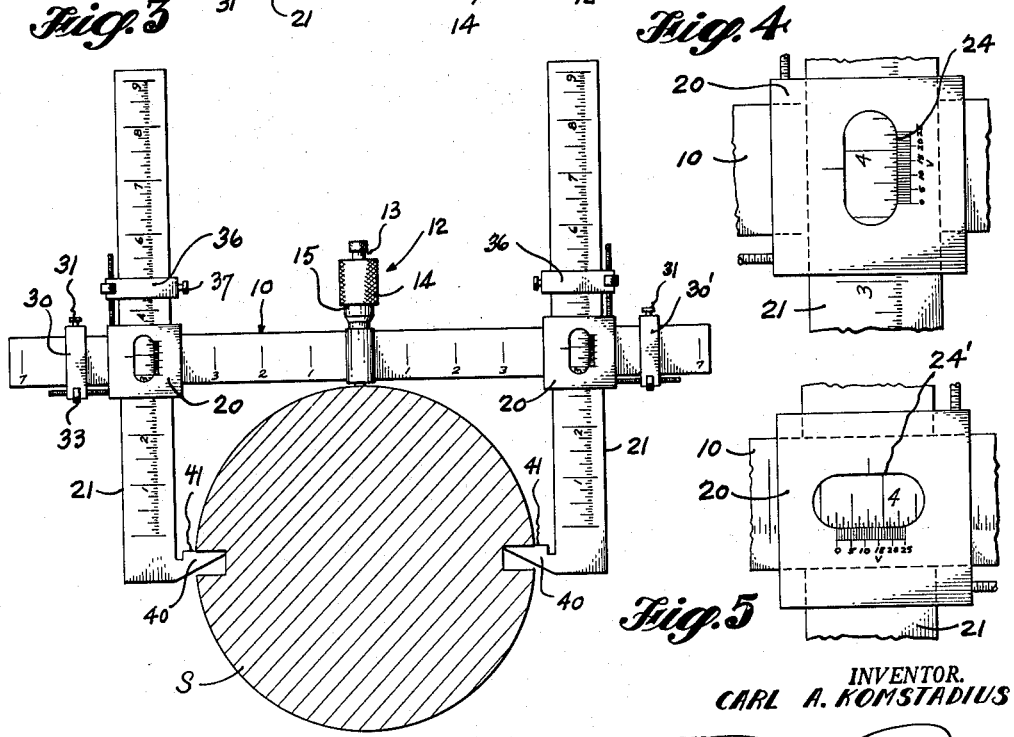
INVENTOR.
CARL A. KOMSTADIUS
BY
Robinson & Berry
ATTORNEYS

KEYWAY MEASURING INSTRUMENT
Carl A. Komstadius, 8337 Jones NW., Seattle, Wash.
Filed June 1, 1961, Ser. No. 114,074
3 Claims. (Cl. 33—174)

This invention relates to measuring instruments and more particularly to a measuring instrument adapted for the measuring and checking the accuracy of keyways as formed in opposite sides of a shaft.

It is the principal object of this invention to provide an instrument of the above stated kind that will enable an inspector or workman using it to detect any deviation of the keyways, as applied to opposite sides of a shaft, from an exact diametric relationship.

It is also an object of the invention to provide an instrument for the above stated purpose that is easily applicable to a shaft for accomplishing its functional purposes; that is comparatively simple in its mode of application and use, and whereby measurements may be readily taken and visually noted.

Further objects and advantages of the present invention reside in the details of construction of its parts; in their assembled relationship and in the mode of use of the instrument, as will hereinafter be fully described.

In accomplishing the above mentioned and other objects of the invention, I have provided the improved details of construction, the preferred forms of which are illustrated in the accompanying drawings, wherein:

FIG. 1 is a side view of the measuring instrument of this invention as adjusted to an open position for application to a shaft.

FIG. 2 is a top edge view of the same.

FIG. 3 is a view of the instrument as applied to a shaft in taking position measurements of its keyways.

FIGS. 4 and 5, respectively, are enlargements of the verniers as applied to the legs at its opposite end portions of the cross bar.

Referring more in detail to the drawings:

The present instrument, or tool, comprises a flat cross-bar 10 that is formed at a point midway of its ends with a bearing 11 mounting a micrometer, here designated in its entirety by numeral 12. The micrometer is of the usual, well known formation in that it comprises a spindle 13 adapted to be rotatably adjusted by a knurled thimble 14 fixed to its upper end. The thimble is formed with internal clearance that allows it, as rotated to move either up and down, as it is rotated, over a sleeve 15 that is fixed in the bar bearing 11 to extend upwardly therefrom, as shown in FIG. 2. Graduations are marked on the sleeve and on the thimble in the usual way. The spindle is threaded axially through the bearing 11 and extends from its lower end. The pitch of the thread is 40 threads per inch and the bearing 11 through which it passes is threaded accordingly. One complete turn of the thimble 14 will thus advance or retract the spindle $\frac{1}{40}$ of an inch, that is, 0.025 inch. The sleeve 15 is graduated so that one small division of the scale corresponds to the endwise movement of one complete turn of the thimble which has its lower peripheral edge chamfered and graduated.

Fitted to and slidably adjustable along the opposite end portions of the cross-bar 10, which is disposed edgewise in use, are bearing blocks 20–20', and slidably mounted by these blocks for endwise adjustment therethrough are paired legs 21–21' held at right angles to the bar 10; these being held in parallel relationship to each other for all positions of their adjustment. The bar 10 is graduated in inches and fractions thereof in opposite directions as shown in FIGS. 3 and 5, reading from the axial line of the micrometer. The paired legs 21–21' are graduated in inches and fractions thereof along their opposite sides reading upwardly from near their lower ends. The blocks 20–20', whereby the arms 21–21' are mounted on the bar 10, are each formed with reading or sight openings 24–24' in their opposite side faces, as shown in FIGS. 4 and 5; each of these openings being of an elongated oval formation to permit easy reading of the scales made visible therethrough; the graduations on the bar 10 being read through the openings 24 and those as provided on the forward faces of the two legs 21–21' through the openings 24.

It is to be observed that the bar 10 is graduated in inches and fractions thereof in opposite directions from its center point, and that the legs 21 are graduated from points near the lower, or foot ends thereof to their opposite ends.

Collars 30–30' are applied to opposite end portions of bar 10 and are slidable therealong to various positions and are adapted to be fixedly secured by set screws 31 applied through the collars for tightening against the bar. Each collar is equipped with a threaded block adjusting rod 22 that has fixed connection at one end with the block 20 at that end of the bar 10 and has a nut 33 threaded thereon and rotatably contained against lateral movement in a notch in the lower end of the corresponding collar thus to provide for making fine shifting adjustments of the block along bar 10.

Likewise, collars 36–36 are applied to the legs 21—21 at points above the blocks 20—20 and these are equipped with locking set screws 37 and fine adjustment rods 38 and nuts 39 in a manner as above described, for fine up and down adjustment of the legs.

At its lower end, as herein shown, each leg 21 has an inturned foot 40 tapered to a point and formed with a top edge 41 at a right angle to the longitudinal inner edge of the leg and parallel with the bar 10.

In using the instrument, an exact determination of the diameter of the shaft is made in the usual way and from this the width of the keyway grooves is subtracted and the remainder then divided by one-half. The legs 21—21 of the instrument are then adjusted to readings corresponding thereto and the instrument applied to the shaft S as shown in FIG. 3. If the top edges 41 of the two inturned feet exactly align with the top edges of the two keyways they will be in exact diametric alignment. If adjustment is required in the length of the leg measurements as read in the openings 24' of blocks 20, then the position of the keyways is in error.

The fine adjustment of the blocks 20 along the bar 10 is accomplished by the rotation of the nuts 33 and the fine endwise adjustments of the legs 21–21' are made by rotation of the nuts 39—39. These adjustments provide for equal and exact positioning of the legs in relationship to the bar 10. After such adjustments have been accomplished, the instrument is then applied to the shaft as illustrated in FIG. 3. When so positioned, the accuracy of the forming and positioning of the keyways is then determined or checked by micrometer 12. This is accomplished by the use of the micrometer in the conventional manner whereby a "reading" is established by rotating the thimble 14 until the spindle 13 engages the shaft.

The conventional manner of forming keyways is to first form a keyway on one side of the shaft. After this keyway is formed, the instrument may then be used to establish the position of the other keyway in exact diametric alignment. This is accomplished by mathematically calculating the diametric distance from the perimeter to the top side of each keyway. The legs are then set in proper position relative to the bar. The instruments are then placed on the shaft and the position of the top side of the other or opposite keyway is marked on the shaft. After forming the keyway, the accuracy of its position and the relative position can be ascertained as herein described by the use of the micrometer.

I claim:

1. An instrument for determination of the accuracy of location of longitudinal keyways in the opposite sides of a shaft, said instrument comprising a cross-bar adapted to be disposed on edge transversely of said shaft to extend to opposite sides thereof, a micrometer caliper mounted on said cross-bar at the medial point thereto and at right angles thereto, a pair of leg mounting blocks slidably mounted on and for adjustment along said cross-bar, a pair of legs slidably and adjustably mounted by said blocks at right angles to said cross-bar, each of said legs including an inturned foot at its inner end to be holdingly in the keyway at the corresponding side of said shaft, said cross-bar including a graduated scale extending in opposite directions from its medial point to indicate the distance of each of said legs from the center point of the cross-bar and said legs including a graduated scale upwardly from said foot for indicating the distance of each said foot below said cross-bar.

2. An instrument as in claim 1 including means mounted on said cross-bar and interconnected to a respective block to lock the block on the cross-bar and to make fine adjustments of the position of the block.

3. An instrument as in claim 1 including means to lock and adjust the position of each leg in relationship to said cross-bar and block.

References Cited in the file of this patent

UNITED STATES PATENTS

| | | |
|---|---|---|
| 85,430 | Burrows | Dec. 29, 1868 |
| 1,145,852 | Shramm | July 6, 1915 |
| 2,321,888 | Baracskai | June 15, 1943 |
| 2,807,091 | Michelson | Sept. 24, 1957 |
| 2,994,963 | Turner | Aug. 8, 1961 |